Feb. 3, 1953
C. E. TACK
2,627,322
BRAKE HEAD ARRANGEMENT
Filed June 10, 1948
2 SHEETS—SHEET 1
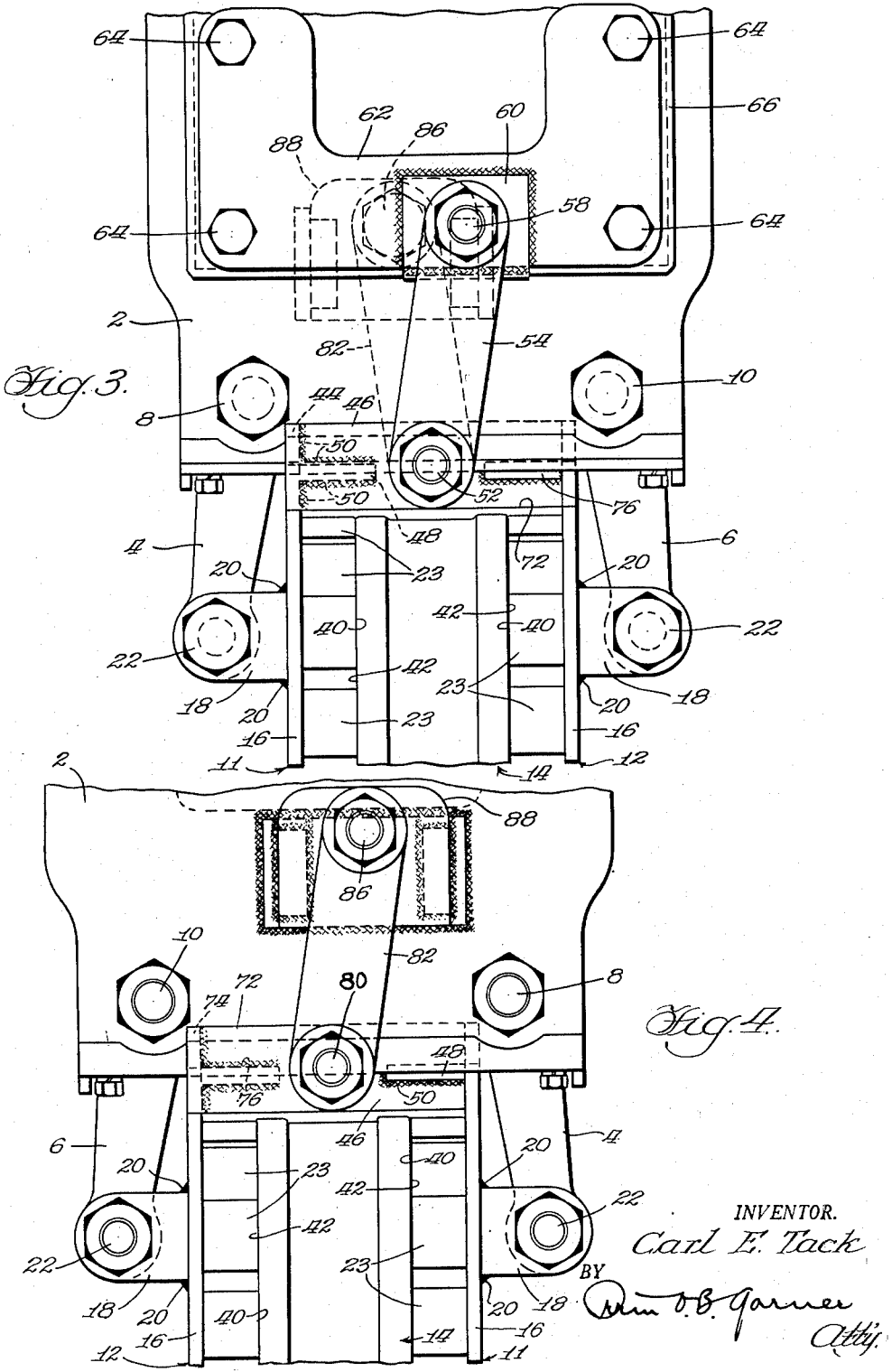
INVENTOR.
Carl E. Tack
BY
Wm. O. B. Garner
Atty.

Feb. 3, 1953     C. E. TACK     2,627,322
BRAKE HEAD ARRANGEMENT
Filed June 10, 1948     2 SHEETS—SHEET 2
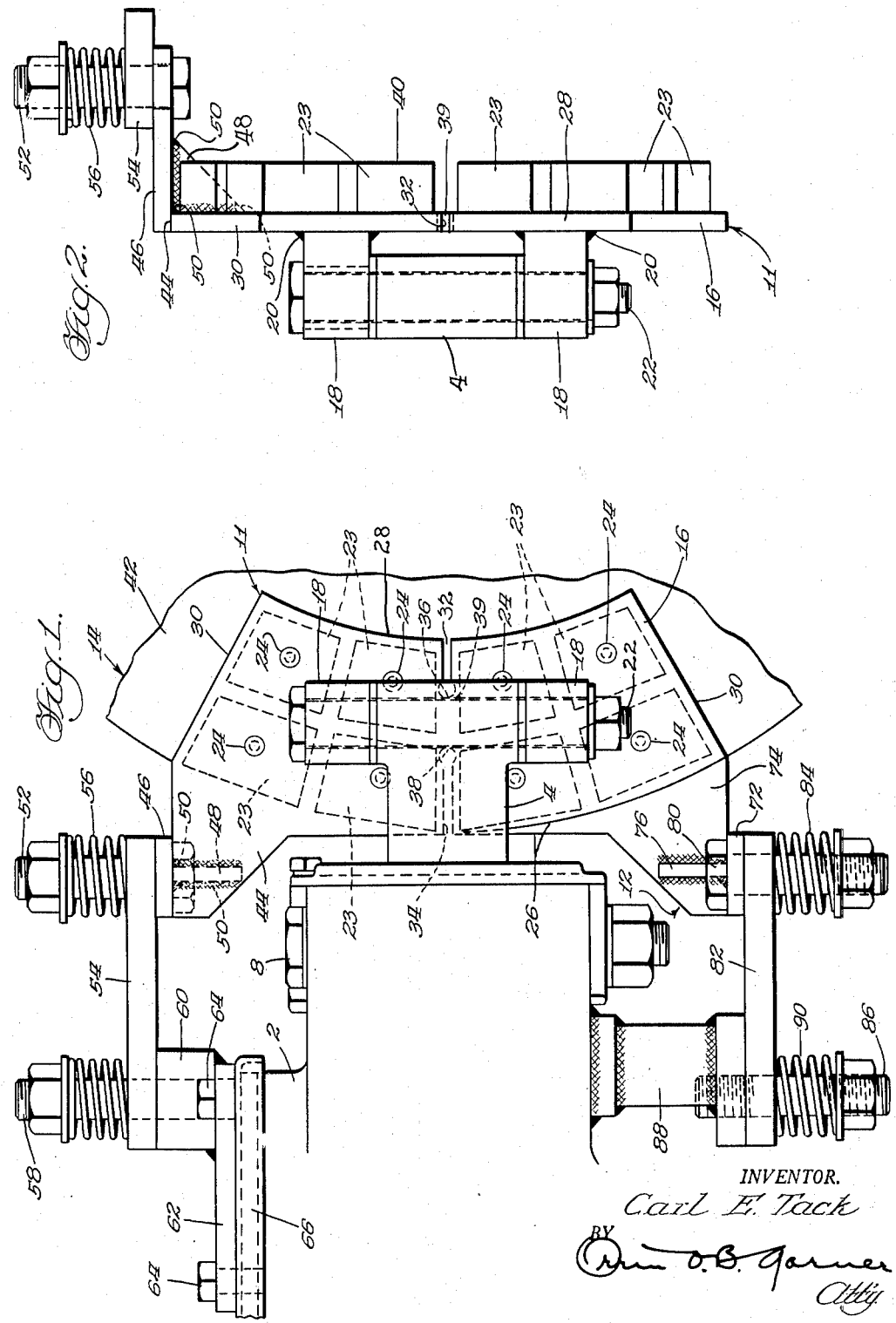
INVENTOR.
Carl E. Tack Patented Feb. 3, 1953

2,627,322

UNITED STATES PATENT OFFICE 2,627,322

BRAKE HEAD ARRANGEMENT

Carl E. Tack, Chicago, Ill., assignor to American Steel Foundries, Chicago, Ill., a corporation of New Jersey Application June 10, 1948, Serial No. 32,232

17 Claims. (Cl. 188—59)

This invention relates to railway brake equipment and more particularly to a type commonly known as a rotor brake wherein a rotor or a disk carried by a wheel and axle assembly is arranged to be engaged by stators disposed at opposite sides thereof for decelerating the assembly, as for example in the arrangement shown in my Patent No. 2,438,482, issued March 23, 1943, in the United States Patent Office for Railway Disc Brake Arrangement.

The general object of the invention is to provide a simple, rugged rotor brake which will perform efficiently in service and have long life.

A more specific object is to provide means for controlling the application of the stators to the rotor to maintain parallelism between the braking surfaces of the stators and the cooperating friction faces of the rotor whereby the stators are caused to wear uniformly on the full braking surfaces thereof and to engage said friction faces along the full extent of said surfaces. In obtaining such application of the stators to the rotor, the friction faces of the rotor are also caused to wear uniformly. In addition, the braking effort applied to each stator is distributed over the whole area of its braking surface.

A further object is to provide stator control or guide means of novel form which while guiding a stator will not interfere with its application against the rotor due to frictional resistance or a binding action.

Another object is to provide independent control means for each stator.

The invention contemplates the provision of a parallelogram linkage between the stator and an associated support structure, said linkage including a power transmitting element affording support for the stator, and a link arranged to cooperate with said element to afford control means for said stator.

In addition to the necessity of obtaining proper application of the stator to the rotor, provision must be made to prevent the development of localized high pressure areas between the stator and the rotor. These so-called high pressure areas generally result from non-uniform expansion of the composition material of which the brake block or shoe of the stator is made, due to friction heat generated between the shoe and the rotor.

It is a further object of this invention to provide a stator which is capable of flexing away from the rotor to afford relief for these localized high pressure areas.

These and other objects of the invention will be apparent from the specification and the drawings wherein in certain views parts may be omitted where better shown in other views.

In the drawings,

Figure 1 is a fragmentary side view of a brake arrangement embodying the invention;

Figure 2 is an end view, taken from the left, of a portion of the structure shown in Figure 1;

Figure 3 is a top plan view of Figure 1; and

Figure 4 is a bottom plan view of Figure 1.

Describing the invention in detail, the brake assembly comprises a housing or support 2 which may be integral with an associated truck frame (not shown) or part of an arrangement suspended from said frame, as, for example, that shown in my above-mentioned patent. The housing may carry actuating means (not shown) in the form of a power cylinder of usual design for actuating a pair of oppositely arranged power transmitting members or levers 4 and 6 which may be pivotally connected intermediate their ends to the housing on vertical axes by means of bolts 8 and 10, respectively, as is conventional practice. The outer ends of levers 4 and 6 project outwardly of the housing and carry stators 11 and 12, respectively, and between the stators is interposed a brake rotor 14 which may be part of an associated wheel and axle assembly (not shown), as will be readily understood by those skilled in the art.

The stators 11 and 12 at opposite sides of the rotor are of identical construction although reversely arranged in upside-down relation. Each stator 11 and 12 may be of so-called segmental type and comprises a flexible brake head 16 in the form of a substantially flat sheet of steel to the rear or outer side of which a pair of vertically aligned spaced lugs 18, 18 are secured as by welding at 20, 20. The lugs 18, 18 of each pair are arranged to receive the adjacent end of the associated lever therebetween for pivotally mounting the related head thereon, said lugs being connected to the associated lever by means of a pivot element such as a pin or bolt 22 extending through aligned bushed openings in the lugs 18, 18 and the adjacent end of said lever. A composition brake shoe is secured to the inner side of each plate 16, said shoe being of generally arcuate form and, as illustrated herein, comprises a series of arcuately arranged spaced pads 23, each of which is secured to the brake head by rivet means 24. The pads may be molded of composition material such as commonly used for such purposes.

Each brake head 16 is defined by an outer circumference 26, and an inner circumference 28 with respect to the axis of the rotor, and radial ends 30, 30 (Figure 1) and is provided at its transverse center line with radially aligned slots 32 and 34. The slot 32 extends from the radially inner edge or circumference of the head in a direction toward the radially outer edge 26 thereof and terminates in a generally circular portion 36. Slot 34 extends from the radially outer edge 26 of the brake head in a direction radially inwardly and terminates in a generally circular portion as at 38 at its inner end. The slots 32 and 34 are spaced from each other radially of the brake head 16 and together divide the brake head into upper and lower portions which are joined by the metal or segment 39 of the head remaining between the slots. It will be observed that segment 39 is substantially rectangular in form extending lengthwise between the radially inner and outer perimeters of the head. In forming slots 32 and 34 with rounded portions at 36 and 38, concentration of stresses in these areas on flexing of the head is avoided. The provision of slots 32 and 34 allows flexing of the brake head within the elastic limits permitted by the steel material composing the head as hereinafter described. It will be noted that the upper lug 18 is connected to the upper portion of the head and the lower lug 18 is connected to the lower portion of the head so that each portion has an independent connection to the associated lever.

Each brake shoe provides a substantially flat surface 40 arranged to engage a generally flat radial braking surface 42 on the adjacent side of the rotor. The brake head of stator 11 is provided with a lug 44 at its upper end, projecting preferably radially outwardly of the head in the plane thereof. An arm 46 extending approximately normal to the vertical plane of the head 16 of stator 11 transversely thereof is rigidly secured at its outer extremity as by welding to lug 44. The arm 46 is additionally connected to the brake head of stator 11 by means of a gusset 48 welded as at 50, 50 to the lug and underside of arm 46. The arm 46 is pivoted at its inner end by means of a bolt 52 to one end of a control member or link 54. The bolt 52 is held against rattling by means of a spring 56 which is compressed between a nut on the bolt 52 and the link 54. The link 54 is arranged substantially parallel with the lever 4 and is pivoted at its other end on a stud 58 threaded into a block 60. The block is secured preferably by welding to a mounting plate 62 removably secured as by bolts 64, 64 to a cover plate 66 on the top of the housing 2. From a consideration of Figure 3 it will be observed that by means of lever 4 and link 54 a parallelogram linkage is obtained between the stator 11 and the housing or support 2.

The brake head of stator 12 is also provided with an arm designated 72 connected to a lug 74, which is preferably formed as part of the lower end of the brake head of stator 12, the connection between arm 72 and lug 74 being reinforced by means of a gusset 76 welded thereto. The inner end of arm 72 is pivoted by means of a bolt 80 to one end of a link or control member 82, the connection between the link 82 and the arm being made rattle-free by a spring 84 compressed between a nut on the bolt and the link 82. The other end of the link 82 is pivoted by a bolt or stud 86 to a bracket 88 which is secured as by welding to the underside of the housing 2. An anti-rattle spring 90 is interposed between the link 82 and a nut threaded on the bolt or stud 86. Thus it will be observed from a consideration of Figure 4 that a parallelogram linkage between the stator 12 and the housing or support 2 is provided by the lever 6 and link 82.

The parallelogram linkage between each stator and the support controls the application of the associated stator against the related friction surface on the rotor and maintains the brake head substantially parallel to the associated rotor friction surface.

In operation, levers 4 and 6 are actuated by associated power means (not shown). These power means form no part of the present invention, and may be, for example, an air cylinder device such as heretofore stated or may even be hand operated as will be readily understood by those skilled in the art. On actuation of levers 4 and 6 the stators 11 and 12 are moved against the opposite sides of the rotor, thereby engaging surfaces 40, 40 of the shoes on the respective stators with the associated rotor surfaces 42, 42 for decelerating the rotor. The shoe on each stator has a tendency when in use to heat excessively in localized areas, as is well known in the art. The expansion of the shoe, which results from thus heating the same, tends to develop swelling in certain local areas and this results in a concentration of pressure in those areas and an extremely high energy dissipation demand per unit of area which is one cause for so-called thermal cracking of the rotor braking surfaces. Experience, as well as theoretical studies, has definitely established that unless these high pressure areas are relieved, erratic braking action and early failure of the rotor will result. To forestall such occurrence, the stators 11 and 12 are flexible, as hereinafter discussed, both torsionally and transversely. Each brake head 16 comprises top and bottom portions connected by a segment 39 of the head which is formed of flexible steel plate, as above noted, to accommodate relative torsional movement of the brake head portions on the associated pivot pin 22. The segment 39 also affords bending of the head between the top and bottom portions thereof to permit either portion to relieve excessive pressure against a localized rotor area, and this bending is accommodated by providing adequate clearance of the order of $\frac{3}{32}$ of an inch between each lug 18 and the associated pivotal securing element 22 and by providing similar clearance between each arm 46 or 72 and the respective bolt and nut assemblies 52 and 80.

It will be understood that the above-described guide means function cooperatively with the features of flexibility of the heads, and prevent the stators from freely pivoting on the levers and wearing away diagonally across their faces and that torsional displacement of the top and bottom portion of each head due to flexing thereof affords adjustment independent of the guide means. Thus, the guide means control the application of stators and the flexibility of the heads affords fine adjustment of the stators against the rotor.

I claim:

1. In a rotor brake assembly, a support structure, a rotor, a lever fulcrumed to said structure, a stator at one side of said rotor pivoted to said lever, said stator comprising a brake head member formed as an arcuate segment and comprising curved radially inner and outer edges, said member being formed with slots extending radially outwardly from said inner edge and radially inwardly from said outer edge, said slots dividing said head into sections connected by the portions of said member between said slots, friction pads mounted on one side of said member, substantially flat radial braking surfaces on the rotor and said pads adapted for braking cooperation with each other for decelerating said rotor, said segments being flexible axially of said rotor upon braking application against said rotor to prevent the development of localized high prssure areas between said rotor and said stator, thereby preventing uneven wear on said surfaces, and means for guiding said stator in a manner obtaining parallelism between said surfaces on said pads and said rotor comprising an element pivoted at spaced points to said structure and to said stator.

2. In a rotor brake assembly, a support structure, a rotor, a stator at each side of said rotor adapted for braking cooperation therewith, a lever at each side of said rotor pivoted to said structure and to the adjacent stator, and means for guiding each stator in its movement with respect to said rotor, said means comprising a radial extension on each stator, an arm connected to each extension and extending transversely of the rotor, and a link pivoted to the end of each arm remote from the associated extension and to said support structure.

3. In a brake arrangement, a support structure, a rotor, a stator, a lever fulcrumed to said structure at one side of said rotor pivoted to said stator, substantially flat radial braking surfaces on the rotor and stator adapted for braking cooperation with each other for decelerating said rotor, an extension on said stator in the plane thereof projecting toward said support structure, an arm connected to said extension and extending transversely thereof adjacent the radial outer periphery of said rotor, and a link pivoted at one end to said arm and at the other end to said support structure.

4. In a rotor brake arrangement, a support, a rotor, a pair of oppositely arranged levers disposed at opposite sides of said rotor and pivoted to said support, stators at opposite sides of said rotor pivoted to respective levers, an arm extending transversely of said rotor connected to the bottom extremity of one stator, an arm extending transversely of said rotor connected to the upper extremity of the other stator, and a link pivoted to each arm and to said support.

5. In a rotor brake arrangement, a support, a rotor, a lever pivoted to said support and extending at one side of said rotor, a stator pivoted to said lever and adapted for braking cooperation with said one side of said rotor, said stator having an extension adjacent one of its extremities projecting toward said support, an arm connected to said extension and extending transversely of said rotor and arranged in overlapping relationship therewith radially thereof, a rigid member pivoted at one end to the end of said arm remote from said extension and at its other end to said support, the distance between the points of pivot of said member with said support and said arm being substantially equal to the distance between the points of pivot of said lever with said stator and said support.

6. In a rotor brake assembly, a support, a brake rotor, a lever pivoted to said support and extending at one side of said rotor, a stator pivoted to said lever and adapted for braking engagement with said one side of said rotor, an arm extending transversely of said stator and connected thereto, a rigid member, pivot means connecting one end of said rigid member to said arm, pivot means connecting the other end of said member with said support, and resilient means compressed between each pivot means and said member for urging the latter into frictional engagement with said arm and said support.

7. In a brake arrangement, a support structure, a rotor, a pair of levers disposed at opposite sides of said rotor and pivoted to said support, stators at opposite sides of said rotor adapted for braking cooperation therewith and pivoted to respective levers, each stator comprising a brake head, the brake head of one of said stators having a lug extending radially outwardly with respect to said rotor above said support, the brake head of the other of said stators having a lug extending radially outwardly of said rotor beneath said support, an upper arm connected to said first-mentioned lug, a lower arm connected to said last-mentioned lug, said arms extending transversely of said rotor above and beneath said support, respectively, a link disposed above said support pivotally connected at one end to said upper arm and at its other end to said support, and a link disposed beneath said support and connected at one end to said lower arm and at its other end to said support, the distance between the points of pivot of each link being substantially equal to the distance between the points of pivot of each lever to the support and the related stator.

8. In a rotor brake arrangement, a substantially horizontally disposed support, a substantially vertically disposed rotor, a brake lever extending at one side of said rotor pivoted on a substantially vertical axis to said support, a stator pivoted on a substantially vertical axis to said lever for engagement with said one side of said rotor, said stator comprising a lug adjacent its upper extremity extending substantially parallel to said rotor radially outwardly with respect thereto, a substantially horizontal arm connected at one end to said lug and extending transversely of said rotor around the edge thereof in radially spaced relationship thereto, a substantially horizontal link pivoted at one end on a substantially vertical axis to the other end of said arm, said link being disposed above said support, a cover plate secured to the top of said support, a boss connected to the top of said cover plate, and pivot means connected to said boss and to the other end of said link.

9. A stator assembly comprising a brake head including a substantially flat flexible metallic member, friction shoes mounted on one side of said member and connected thereto, spaced mounting lugs connected to the opposite side of said member, said member comprising a lug in the plane thereof at one of its edges, and a control arm connected to said last-mentioned lug and extending transversely of said member and projecting beyond said one side thereof.

10. A stator comprising a flexible brake head including a body portion formed as an arcuate segment with arcuate inner and outer edges and radial ends, said body portion being formed with slots intermediate its ends extending radially outwardly from the inner edge and radially inwardly from the outer edge and dividing said head into sections, each section comprising a plurality of friction pads on one side thereof and a mounting lug on the opposite side thereof, said sections being interconnected by the metal between said slots.

11. In a rotor brake for a railway car truck, a support extending transversely of the truck, a friction element rotatable adjacent to the support, a pair of substantially vertical flexible friction shoes pivotally carried from the support at opposite sides of the element for movement in arcuate paths to applied and released positions with respect to said element, and a control assembly for each shoe for holding the same substantially parallel to the friction element, said assembly comprising a link pivoted at spaced points to one end of one shoe and one side of said support and another link pivoted at spaced points to the other end of the other shoe and the other side of the support, the axes of pivot of the shoes and links being substantially parallel.

12. In a brake arrangement, a rotor, a brake head pivotally mounted on an axis substantially parallel to the plane of the rotor at one side thereof and adapted for engagement therewith, a support, and a guide pivoted at one end to one end of the head and at the other end to the support on axes parallel to the first-mentioned axis, said head being flexible, the position of said guide being so arranged as not to interfere with the flexing of the head.

13. In a rotor brake arrangement, a support, a rotor, a pair of oppositely arranged levers disposed at opposite sides of said rotor and pivoted to said support, stators at opposite sides of said rotor pivoted to respective levers, an arm extending transversely of said rotor connected to the bottom extremity of one stator, an arm extending transversely of said rotor connected to the upper extremity of the other stator, and a link pivoted to each arm and to said support, each lever being parallel with its associated link.

14. In a rotor brake arrangement, a support, a rotor, a pair of oppositely arranged levers disposed at opposite sides of said rotor and pivoted to said support, stators at opposite sides of said rotor pivoted to respective levers, an arm extending transversely of said rotor connected to the bottom extremity of one stator, an arm extending transversely of said rotor connected to the upper extremity of the other stator, and a link pivoted to each arm and to said support, each lever being parallel with its associated link, the distance between the points of pivot of each link being substantially equal to the distance between the points of pivot of each lever to the support and the related stator.

15. In a rotor brake arrangement, a support, a rotor, a pair of oppositely arranged levers disposed at opposite sides of said rotor and pivoted to said support, stators at opposite sides of said rotor pivoted to respective levers, an arm extending transversely of said rotor connected to the bottom extremity of one stator, an arm extending transversely of said rotor connected to the upper extremity of the other stator, and a link pivoted to each arm and to said support, each lever being parallel with its associated link, the distance between the points of pivot of each link being substantially equal to the distance between the points of pivot of each lever to the support and the related stator, and resilient means to urge each link into frictional engagement with the support and its associated lever.

16. A stator comprising a brake head having a flexible body portion having inner and outer edges extending between its ends, slots intermediate the ends of said body portion, said slots extending radially inwardly from the outer edge and radially outwardly from the inner edge to divide said portion into segments having friction means on one side of said portion for engagement with an associated rotor surface, and means on the other side of said portion for connecting the head to an associated actuator.

17. A stator according to claim 16, wherein the inner end of each slot is formed as a segment of a circle having a diameter greater than the width of the slot.

CARL E. TACK.

REFERENCES CITED

The following references are of record in the file of this patent:

UNITED STATES PATENTS

| Number | Name | Date |
|---|---|---|
| 1,309,353 | Copony | July 8, 1919 |
| 1,711,602 | Kindler | May 7, 1929 |
| 2,215,346 | Bush | Sept. 17, 1940 |
| 2,236,311 | Eksergian | Mar. 25, 1941 |
| 2,348,077 | Ledwinka | May 2, 1944 |
| 2,438,482 | Tack | Mar. 23, 1948 |
| 2,451,326 | Eksergian et al. | Oct. 12, 1948 |